US00RE44113E

(19) United States
(12) Reissued Patent
Winter et al.

(10) Patent Number: US RE44,113 E
(45) Date of Reissued Patent: Apr. 2, 2013

(54) METHOD OF MAKING COLOR FAN DECK

(75) Inventors: Steven B. Winter, Highland Park, IL (US); Stanley I. Lerner, Glencoe, IL (US)

(73) Assignee: Color Communications, Inc., Chicago, IL (US)

(21) Appl. No.: 13/467,771

(22) Filed: May 9, 2012

Related U.S. Patent Documents

Reissue of:

(64) Patent No.: 8,007,621
Issued: Aug. 30, 2011
Appl. No.: 11/537,259
Filed: Sep. 29, 2006

U.S. Applications:

(60) Provisional application No. 60/725,505, filed on Oct. 11, 2005.

(51) Int. Cl.
*B32B 37/16* (2006.01)
*B32B 38/04* (2006.01)

(52) U.S. Cl. ..... 156/250; 156/182

(58) Field of Classification Search ..... None
See application file for complete search history.

(56) References Cited

U.S. PATENT DOCUMENTS

| | | | |
|---|---|---|---|
| 3,224,113 | A | 12/1965 | Goldsholl et al. |
| 4,379,696 | A | 4/1983 | Lerner |
| 4,457,718 | A | 7/1984 | Lerner |
| 5,313,884 | A | 5/1994 | Lerner et al. |
| 5,358,280 | A | 10/1994 | Scales |
| 6,086,694 | A | 7/2000 | Winter et al. |
| 6,112,665 | A | 9/2000 | Teter et al. |
| 2002/0040648 | A1 | 4/2002 | DeProspero et al. |
| 2004/0253422 | A1 | 12/2004 | Truog et al. |

OTHER PUBLICATIONS

Micro Format, Inc., "Let's End the Confusion", http://web.archive.org/web/19990428113819/http://www.paper-paper.com/weight.html, 1999.*

* cited by examiner

*Primary Examiner* — Philip Tucker
*Assistant Examiner* — Nikolas Harm
(74) *Attorney, Agent, or Firm* — Fitch, Even, Tabin & Flannery LLP

(57) ABSTRACT

The present invention is directed to a paint color sample display device for the illustration of paint colors and a method for making such a color display device. The color display device may be a color fan deck which displays color on each side of the blades of the fan deck. The fan blades include a painted polymeric film laminated to both sides of a base paper to form a painted film/base paper/painted film laminate for the fan blades.

12 Claims, 2 Drawing Sheets

METHOD OF MAKING COLOR FAN DECK

Matter enclosed in heavy brackets [ ] appears in the original patent but forms no part of this reissue specification; matter printed in italics indicates the additions made by reissue.

*This application claims the benefit of U.S. Provisional Application No. 60/725,505, filed on Oct. 11, 2005, which is fully incorporated by reference in its entirety.*

FIELD

The present invention relates to color sample display devices for paint products where paint is illustrated on both sides of the device. More particularly, the present invention is directed to a color sample display device which is a color fan deck with a plurality of blades that display colors on each side of the color fan blade. The fans have blades which are pivotally joined together to form the fan or fan deck.

BACKGROUND

Paint colors often are displayed on color swatches mounted on a flat planar base which are joined together to form a deck or a fan deck with blades which are pivotally spread or fanned to display color. Each blade in the deck has a color swatch which displays one or more colors. Each blade has one or more paint coated swatches on one side of the blade to display color. In order to display a large number of colors, either a plurality of individual swatches on each blade have to be made smaller or a larger number of individual blades with color swatches need to be combined in a single deck. The resulting deck may become rather large and cumbersome to transport and use.

Color display devices need to display colors attractively. The color displays on the individual fan blade color cards cannot be wrinkled and curled and must lay flat on the card or fan blade. In the past the flat planar mount base had to be fairly thick to avoid wrinkling and curling. This also increased the thickness of the fan with each blade displaying color only on one side of the fan blade. It also has been found that fan blades illustrating color on two side sides of the fan blade with painted film on each side would readily have air pockets form under the film. These pockets render the blade unattractive. Further, it has been found that fan blades with color swatches on both sides will transfer color to the underlying or interfacing blade surface. This is especially the case where a dark color will transfer color to an underlying lighter colored blade surface.

An object of the invention is to provide a color display product which illustrates color on two opposite surfaces of a mount base.

Another object of this invention is to provide a color fan deck with a plurality of blades which can each display one or more different colors on each side of the fan blades.

Another object of the invention is to provide color fan deck with painted film on both sides of a fan blade mount base without wrinkling and curling of the blades.

Another object of the invention is to provide a color fan deck with a plurality of color displaying fan blades which is thinner than a fan deck which shows the same number of colors on one side of the fan blade.

A further object of the invention is to provide a method for making a color fan deck having a plurality of color fan blades which display color on both sides of the blade.

These and other objects will become more apparent with reference to the description set forth below.

SUMMARY

The present invention provides a color display product, and in one important aspect, a color display fan deck which illustrates paint colors and a method for making the color display fan deck. The color display fan deck includes blades with color swatches on each side of the blade. A plurality of planar swatch bearing blades are pivotally joined together at one end to form a deck or fan deck of swatch bearing blades. Since each swatch bearing blade can display a different color on each side of the blade, the fan deck of color cards can display twice as many colors as compared to a deck of color cards where each blade only displays one color or colors on one side of the blade.

Each swatch bearing blade includes a flat elongated base paper laminated on both sides with a paint coated polymeric film. Lamination of the polymeric film to both sides of the base paper and covering substantially all of the surface of both sides of the blade provides a fan blade with a durable flat surface that does not wrinkle or curl up on itself. With both sides of the base paper laminated to a paint coated polymeric film, printing can be done on both sides of the blade at once which reduces printing costs. With each blade displaying at least two different colors and using one half the usual number of blades to display the same number of paint colors, collating costs are reduced by half as compared to color fan decks which have blades which display color on one side of the blade.

Each fan deck includes a paint coated polymeric film laminated to both sides of a base paper to form a blade of the fan deck. The polymeric film is an acrylic coated polypropylene, or acrylic coated biaxially oriented polypropylene, or polyethylene terephthalate, commonly sold under the name of Mylar, which is a registered trademark of E.I. DuPont DeNemours & Co. Any type of coating on the film which makes the film amenable to be coated and retain paint is appropriate. These films provide the blade durability around the fastener which pivotally holds the ends blades to form a fan. The films provide a painted film/paper/painted film laminate to provide blades which are less likely to rip or tear around the end fastener as compared to just a paper blade with a paper mount base and paper painted swatch. With the polymeric film on both sides of the thin paper base of the blade, the likelihood of the blade with a thin paper base curling is reduced. The films laminated to the base paper have a thickness of about 1.35 mils to about 5 mils. When the polymeric film is polypropylene, the polypropylene film has a thickness of about 1.35 to about 1.6 mils. When the polymeric film is polyethylene terephthalate, the polyethylene terephthalate film has a thickness of about 2 to about 5 mils. The base paper used in the color card can be thin as about 0.0014 inches, but preferably has a thickness of from about 0.002 to about 0.015 inches.

The plurality of color display blades are joined together with a screw or other fastener which permits each of the blades to be pivotally fanned or rotated to display the color on both sides of the fan deck blades. Each individual color display blade can be pivotally repositioned so that the color on each side of the blade can be viewed and compared with other colors and the environment for which the color is intended.

The method of the invention includes applying paint to the surface of a large web substrate of an organo polymeric film with a knife coater or roller-coater as is known. The film is rolled from a roll as a web and then coated. In an important aspect the paint is a water base paint. The paint is applied to the film and the painted film web then is dried and then laminated to a large base paper web using known lamination techniques. The adhesive is applied to the paint or film after coating the film web with paint. Preferably the adhesive is printed onto the film or paint, such as by gravure printing.

In an important aspect, the paint is a water based paint with an acrylic binder resin which uses an acrylic polymer or copolymer binder. In an important aspect, biaxially coated polypropylene is coated with the water based paint and the coated polypropylene is then dried at 180 degrees F. for three minutes in an oven by moving the painted polypropylene web through the oven heated to 180 degrees F. Thereafter the adhesive is printed onto the painted film.

The paint may be on the outer surface of the film, or with a clear film the paint may be on underside of the film with adhesive on the surface of the paint to hold it to the base paper, the paint being viewed through the clear film. At this point the laminated film and paper web may be rolled into a large roll. As a control that the painted film is dry and the adhesive has properly set and is adhering to the paper base, heaters, such as infra red heaters, heat the web as it is being rolled into a roll on a cylindrical roller. These heaters heat are heated to about 200 degrees F. to about 225 degrees F. If the adhesive is not properly set air pockets will form between the film and base paper. The adhesive should set in a time and at a temperature which is effective to preclude air pockets forming between the film and the base paper, generally this is less than about ten seconds at about 68° F.

To provide a color swatch on the opposite side of the fan blade, a second film web is painted and dried as the first organo polymeric film web. The second painted film web then has adhesive printed thereon and is laminated to the first painted film/paper laminate to provide a painted film/paper/painted film laminate. The dried paint coated polymeric film may be laminated to the both sides of the base paper simultaneously, but equipment would have to be doubled because the painted film without being laminated to the paper base could not readily be rolled onto itself. A different paint color or tone on the polymeric film will normally be laminated to each side of the base paper to provide a color card that displays two different tones or colors.

The painted filhn/paper base/painted film laminate web then is cut to into individual color display blades which are then collated and joined at one end using known techniques. Fastener openings may be cut in the color cards before or after collating. A deck of color cards is fastened together by inserting a fastener device through the color cards such that they are pivotably attached.

DETAILED DESCRIPTION

Figure 1:
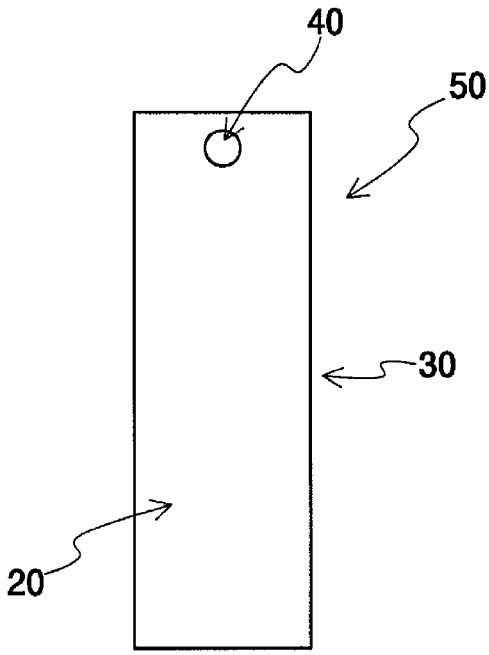
FIG. 1 is a top view of a fan deck with the individual blades precisely aligned on top of each other.

As illustrated in FIG. 1, a fan deck 50 includes a painted polymeric film 20 laminated to all sides of a base paper 30. The fan deck 50 also includes an attachment opening 40 through which a screw or other suitable fastener may be put. The fan deck permits the use of relatively large paint coated swatches which can be used to provide a realistic display of paint color. Ideally, the individual fan blades 10 will be about 2 inches by about 8 inches or even larger.

Figure 2:
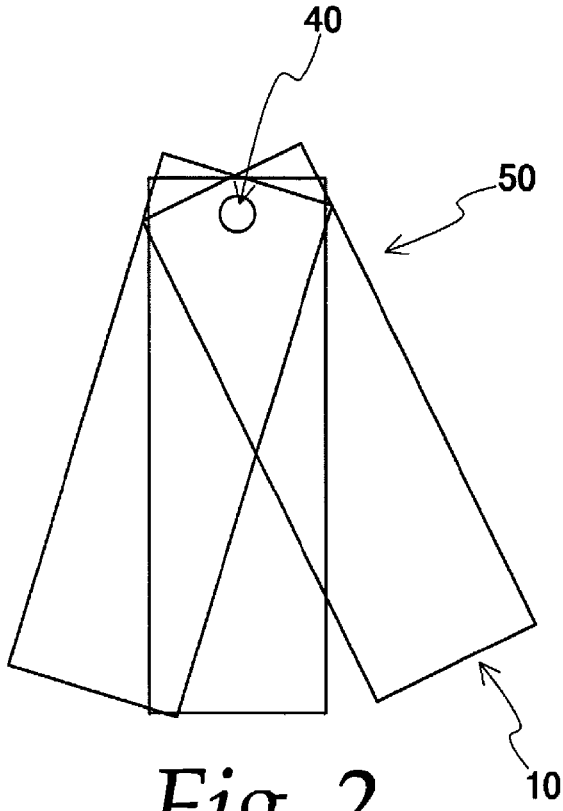
FIG. 2 is a top view of a color fan deck with the blades rotatably or pivotally moved so that the color on each side of the blade can be seen.

Referring to FIG. 2, a fan deck 50 includes a plurality of individual blades 10 which are attached through attachment opening 40 for pivotal rotation and the display of color on both sides of the blades. As noted above, any type of fastener device such as a screw, rivet, nut and bolt, and the like may be inserted through the attachment opening 40 to secure the color cards 10 together. Different fan blades in the deck may be viewed by pivotally rotating the color cards.

Figure 3:
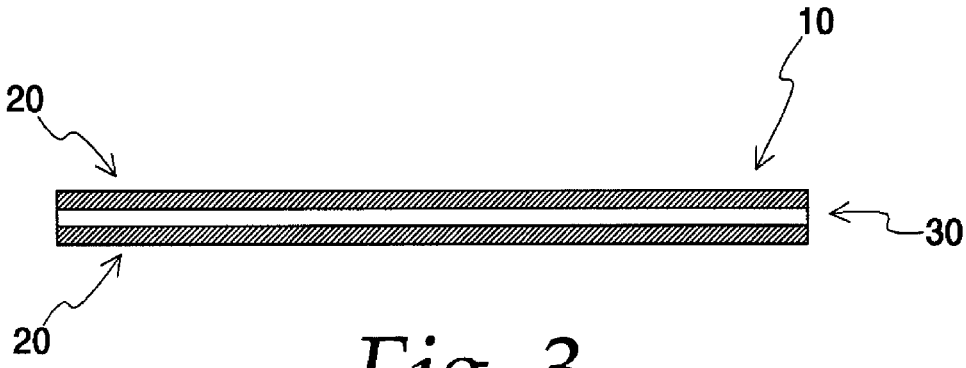
FIG. 3 is a side view of an individual fan blade.

A side view of an individual blade 10 of the fan deck 50 is illustrated in FIG. 3. A flat base paper 30 is laminated on both side with a polymeric film 20. The polymeric film 20 includes a paint coating 25 on its surface. Organo-polymeric films such as acrylic coated (both sides) polypropylene, acrylic coated biaxially oriented polypropylene, or polyethylene terephthalate may be utilized. Polyethylene terephthalate is also known as Mylar which is a registered trademark of E.I. DuPont DeNemours & Co. Although the films may be clear, in an important aspect, the acrylic coated polypropylene is biaxially oriented and pigmented white.

The painted used to make the fan may include an organic solvent, such as a nitrocellulose paint, or the paint may be water disperseable or solvated with water. In an important aspect, the water based paint has an acrylic polymer or copolymer binder. For dark colors the amount of binder resin (the resin which forms the film when the paint drys) is increased over that generally used for lighter colors in an amount effective to minimize transferring color to a lighter chip interfacing with the darker chip of an interfacing blade. It has been found that without this aforedescribed technique, interfacing colors of paint coatings may transfer to one another and most particularly from dark to light paint.

The type of adhesive used in the process of making the paint coated fan blades also is important. It should be capable of being printed, but also should be fast drying so that the paper base will not move or shift during the time when the film and the paper have been jointed as large moving webs as will be described below. Shifting and slow drying create a weak bond between the film web and the paper web. A gravure printed adhesive should be sufficiently dry in at least about 10 seconds and preferably in about 4 to 8 seconds at 68° F. to affix the film web to the paper web such that the aforedescribed air pockets will not form. Moreover, the adhesive should dry sufficiently in less than one hour at 68° F. to provide a bond strength which will tear fiber from the paper base if one were to pull the adhesively attached film from a clay coated paper base. The adhesive should have a solids level of from 45 to 65 weight percent and should provide a dry resin solids level between the film and the base paper of from about 2.5 to 3.7 grams per thousand square inches.

In making the fan deck an organo polymeric film supplied as a large sheet or web in a roll is unrolled and paint is applied to the surface of the unrolled web substrate with a knife coater or roller-coater as is known. The paint is dried by transporting the paint coated polymer web through an oven such that the paint (such as a water base paint) will dry in less than about 3 minutes at an oven temperature which is equal to or less than the softening temperature of the film, e.g. about 180° F. for polypropylene. The paint may be a lacquer based paint with an organic solvent, but in an important aspect the paint is a water based paint, such as a paint with an acrylic binder as described above. In an important embodiment, the water based paint should be dried after being transported for about three minutes through an oven heated to about 180° F.

Figure 4:
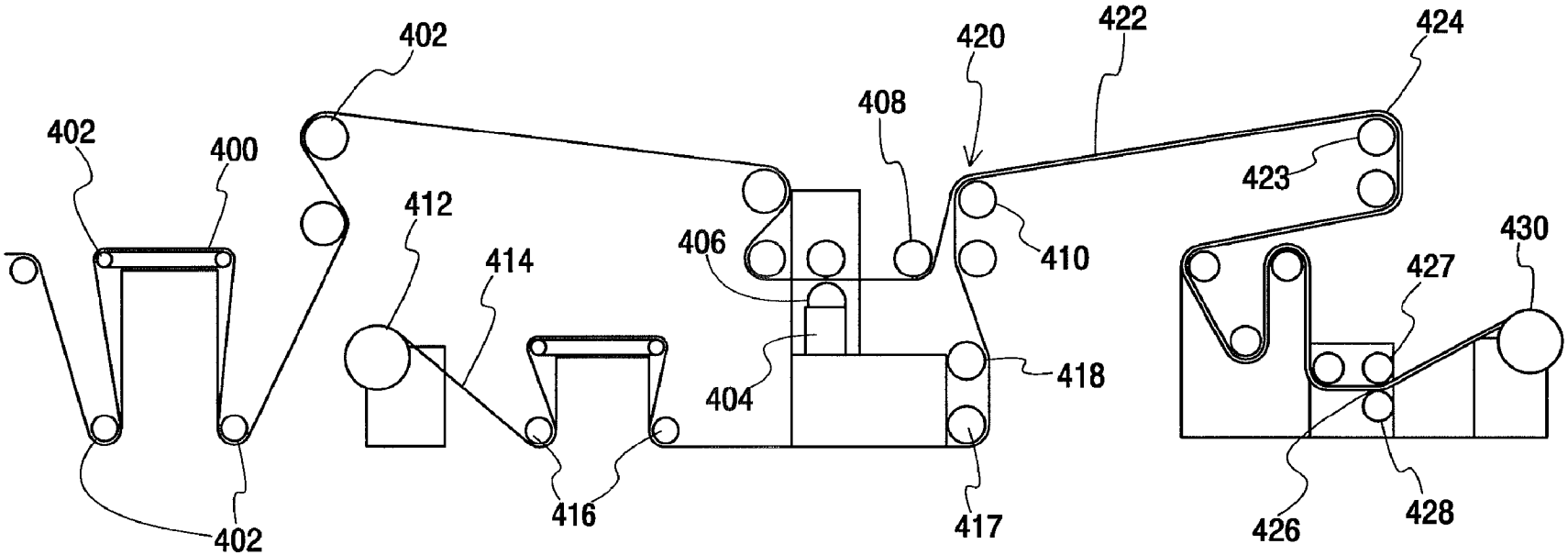
FIG. 4 is a schematic view of the arrangement of equipment used in the method.

As seen in FIG. 4, as the paint coated web of film 400 exits from the drying oven (not shown), the film web then is conveyed over rollers 402 which have guide edges which extend perpendicularly from the ends and surface of the rollers and which keep the film web from running off the surface of the rollers. The film web is conveyed to a printing device 404, such as a gravure printer, with a printing roller 406 which applies glue to the surface of the film web 400. Thereafter the film web is transported with a series of rollers 408 to a laminating point 420 at the surface of roller 410 where the surface of the film web with the glue printed thereon is laminated to a backing paper web 414. The backing paper web 414 is unwound from roller 412 and is conveyed to the laminating point 420 with rollers 416, 417 and 418. These rollers have edge guides which extend perpendicularly from the ends and surface of the rollers and which keep the backing paper web from running off the surface of the rollers. The backing paper web forms the base paper of the fan blade after cutting the paper web is laminated with film on both side of the paper. After the backing paper web is laminated onto the film, it forms a painted film/paper laminate 422 which is conveyed to a roller 423 which creates a stress point 424. The laminate takes from about 4 to about 8 seconds to reach the stress point from the laminating point to at least create an initial adhesive bond between the backing paper period of time that does not permit the creation of air pocket defects between the backing paper and painted film when pass through a downstream nip. After leaving the stress point the laminated web is pressed with a pressing nip 426 between two rollers 427 and 428. After being pressed through the nip, the painted film is rolled onto a roller on rewind stand 430. The dried painted film web with the paper adhesively affixed to it is laminated and pressed with large base paper web by transporting the painted/printed film web with the paper web through a nip of two rollers, one of which has a hard surface and one of which has a resilient surface. Tension on the film web and laminated web are controlled during the lamination to be a minimum such that the painted film is not stretched. This means if a portion of the laminated web is taken off the machine lamination line, it will not curl in the machine direction. It is at this point the laminated film and paper web is rolled into a large roll as at 430. It should be noted that a non laminated painted film should not be rolled as at 430 because it has been found there is a likelihood of damage to the paint surface and stretching of the film.

To provide a color swatch on the opposite side of the fan blade, a second film web is painted and dried as the first organo polymeric film web. The second painted film web then is adhesively laminated to the first painted film/paper laminated to provide a painted film/paper/painted film laminate using side guides to make sure the sides of the film and paper are precisely registered with each other. The painted film/base paper laminate which is rolled onto the rewind stand 430 is merely moved to the position of roller 412 where the material on 430 is unwound and laminated to the second film web using a printer roller as at 406, a laminating point, 420, stress pont 424 and pressing nip 426. This second operation creates a painted film/paper base/painted film laminate web.

The painted film/paper base/painted film laminate web then is cut to into individual color display blades which are then collated and joined at one end using known techniques. Fastener openings may be cut in the color cards before or after collating. A deck of color cards is fastened together by inserting a fastener device through the color cards such that they are pivotally attached.

What is claimed is:

1. A method of making a color display device, the method comprising:

applying paint to a first polymeric film web to provide a first painted polymeric film web;

drying the first painted polymeric film web to provide a first dried painted polymeric film web;

laminating the first dried painted polymeric film web to a base paper web having a thickness of from about 0.0014 to about 0.015 inches to form a painted film/base paper laminate web;

applying paint to a second polymeric film web to provide a second painted polymeric film web;

drying the second painted polymeric film web to provide a second dried painted polymeric film web;

laminating the second dried painted polymeric film web to the painted film/base paper laminate web to provide a painted film/base paper/painted film laminate web; and cutting the painted film/base paper/painted film laminate web to provide painted swatch fan blades, the painted swatches on both sides of the fan blades.

2. The method of claim 1 wherein the fan blades are fastened with a fastener extending through the painted film/base paper/painted film at one end for pivotal rotation of the fan blades around the fastener.

3. The method of claim 2 wherein the fan blades have top and bottom surfaces which are substantially completely covered with a polymeric film

4. A method of making an elongated two sided color display product, the method comprising:

applying paint to a polymeric film web to provide a painted polymeric film web;

drying the painted polymeric film web to provide a dried painted polymeric film web;

printing an adhesive having a solids level of from 45 to 65 weight percent on the dried paint or on the surface of the polymeric film which is opposite to the surface of the film with the paint thereon;

laminating the adhesive printed film to a base paper web having a thickness of from about 0.0014 to about 0.015 inches to form a first paper/film laminate;

rolling the first paper/film laminate into a roll to provide a rolled paper/film laminate;

applying paint to a second polymeric film web to provide a second painted polymeric film web;

printing an adhesive on the second painted film web;

unrolling the rolled first paper/film laminate;

laminating the first paper film/laminate with the second painted polymeric film to form a painted film/base paper/painted film laminate web with painted polymeric film on both sides of the base paper; and cutting the painted film/base paper/painted film laminate web to provide painted swatch fan blades, the painted swatches on both sides of the fan blades.

5. The method of claim 4 wherein the polymeric film has a thickness of about 1.35 mils to about 5 mils.

6. The method of claim 5 wherein the polymeric film is selected from the group consisting of polypropylene, biaxially oriented polypropylene and polyethylene terephthalate.

7. The method of claim 6 wherein the polymeric film is polypropylene.

8. The method of claim 7 wherein the polypropylene film has a thickness of about 1.35 to about 1.6 mils.

9. The method of claim 6 wherein the polymeric film is polyethylene terephthalate which has a thickness of about 2 to about 5 mils.

10. The method of claim 4 wherein the fan blades have top and bottom surfaces which are substantially completely covered with a polymeric film and the fan blades are fastened with a fastener extending through the painted film/base paper/painted film at one end for pivotal rotation of the fan blades around the fastener.

11. The method of claim 4 wherein the base paper web has a thickness of from about 0.002 to about 0.015 inches.

12. The method of claim 2 wherein the base paper web has a thickness of from about 0.002 to about 0.015 inches.

* * * * *